(12) United States Patent
Saigusa et al.

(10) Patent No.: US 9,493,891 B2
(45) Date of Patent: Nov. 15, 2016

(54) METHOD FOR PRODUCING POLYGLYCOLIC ACID RESIN YARN

(75) Inventors: Kotaku Saigusa, Tokyo (JP); Masahiro Yamazaki, Tokyo (JP); Shunsuke Abe, Tokyo (JP); Hisaaki Terashima, Tokyo (JP); Hiroyuki Sato, Tokyo (JP)

(73) Assignee: KUREHA CORPORATION, Tokyo (JP)

( * ) Notice: Subject to any disclaimer, the term of this patent is extended or adjusted under 35 U.S.C. 154(b) by 590 days.

(21) Appl. No.: 13/885,042

(22) PCT Filed: Nov. 7, 2011

(86) PCT No.: PCT/JP2011/075569
§ 371 (c)(1),
(2), (4) Date: May 13, 2013

(87) PCT Pub. No.: WO2013/066955
PCT Pub. Date: May 24, 2012

(65) Prior Publication Data
US 2013/0224485 A1    Aug. 29, 2013

(30) Foreign Application Priority Data

Nov. 15, 2010  (JP) ................................. 2010-255156

(51) Int. Cl.
*D01D 5/08*    (2006.01)
*D01D 5/088*   (2006.01)
(Continued)

(52) U.S. Cl.
CPC ................. *D02G 3/02* (2013.01); *C08G 63/06* (2013.01); *D01D 5/084* (2013.01); *D01F 6/625* (2013.01); *D01G 1/04* (2013.01); *D02J 1/224* (2013.01); *Y10T 428/298* (2015.01)

(58) Field of Classification Search
CPC ........ D01D 5/08; D01D 5/084; D01D 5/088; D01D 5/12; D01D 5/26; D01D 10/02; D01F 6/62; D01F 6/625; D02J 1/22; D02J 13/00
USPC ........... 264/143, 210.8, 211.14, 211.17, 234, 264/237
See application file for complete search history.

(56) References Cited

U.S. PATENT DOCUMENTS 5,232,648 A  8/1993  Kennedy et al.
6,005,019 A  12/1999 Liu
(Continued)

FOREIGN PATENT DOCUMENTS

JP  A-6-128810    5/1994
JP  A-2004-250853 9/2004
(Continued)

OTHER PUBLICATIONS

Extended Search Report issued in European Patent Application No. 11842078.5 dated Apr. 2, 2014.
(Continued)

*Primary Examiner* — Leo B Tentoni
(74) *Attorney, Agent, or Firm* — Oliff PLC (57) ABSTRACT

A method for producing an undrawn polyglycolic acid-based resin yarn, including: a discharge step of discharging a molten polyglycolic acid-based resin through a spinneret, to thereby form a fibrous polyglycolic acid-based resin; a keeping step of keeping the fibrous polyglycolic acid-based resin for 0.0012 seconds or more after the discharge in an atmosphere having a temperature of not lower than 110.5° C. but not higher than a melting point of the polyglycolic acid-based resin; and a cooling step of cooling the fibrous polyglycolic acid-based resin obtained in the keeping step, to thereby obtain an undrawn polyglycolic acid-based resin yarn.

4 Claims, 1 Drawing Sheet

(51) Int. Cl.
*D01D 5/12* (2006.01)
*D01D 5/26* (2006.01)
*D01D 10/02* (2006.01)
*D01F 6/62* (2006.01)
*D02J 1/22* (2006.01)
*D02J 13/00* (2006.01)
*D02G 3/02* (2006.01)
*D01D 5/084* (2006.01)
*C08G 63/06* (2006.01)
*D01G 1/04* (2006.01)

(56) References Cited

U.S. PATENT DOCUMENTS 7,378,045 B2  5/2008  Chen et al.
7,560,159 B2 *  7/2009  Goda .................... D01D 5/253
                                                      428/397
2003/0236554 A1  12/2003  Chen et al.
2005/0074607 A1 *  4/2005  Rim ....................... D01D 5/084
                                                      428/364
2006/0159918 A1  7/2006  Dugan et al.
2007/0150001 A1  6/2007  Hashimoto et al.
2009/0325439 A1 *  12/2009  Kim ......................... D01F 6/62
                                                      442/60
2010/0148391 A1  6/2010  Hashimoto et al.

FOREIGN PATENT DOCUMENTS

WO    WO 96/20648 A1    7/1996
WO    WO 2005/090657 A1    9/2005

OTHER PUBLICATIONS

Jan. 31, 2012 International Search Report issued in International Application No. PCT/JP2011/075569 (with translation).

* cited by examiner

METHOD FOR PRODUCING POLYGLYCOLIC ACID RESIN YARN

TECHNICAL FIELD

The present invention relates to an undrawn polyglycolic acid-based resin yarn, a drawn polyglycolic acid-based resin yarn obtained by drawing the same, and production methods thereof.

BACKGROUND ART

Drawn yarns made of polyglycolic acid-based resins are excellent in mechanical strength and have biodegradability and bioabsorbability. Hence, the drawn yarns have conventionally been used as surgical sutures in the medical field and the like. In addition, since polyglycolic acid-based resins exhibit fast hydrolyzability under high temperature environments, applications of fibers made of polyglycolic acid-based resins to a drilling or completion field of oil recovery and the like have also been studied.

Conventional drawn yarns made of a polyglycolic acid-based resin are produced by the spinning drawn yarn method (SDY method) or by a two-step production method in which an undrawn yarn is fabricated by discharging a molten polyglycolic acid-based resin through a spinneret followed by rapid cooling, and subsequently the undrawn yarn is drawn. The latter method is efficient in mass production, but has the problems that the undrawn polyglycolic acid-based yarns agglutinate, so that the undrawn polyglycolic acid-based yarns cannot be drawn due to deterioration in the releasing properties at drawing, and that the obtained drawn yarns have a large single yarn fineness, and do not have a sufficiently high strength and a sufficiently high elongation, when the operational environment temperature or the temperature and humidity during storage are high.

In addition, Japanese Unexamined Patent Application Publication No. 2004-250853 (PTL 1) discloses a suture fiber made of a copolymer of glycolide and lactide, and a method for producing the suture fiber. In the production method, filaments discharged through a spinneret maintained at a temperature which is higher than the melting point of the copolymer by 40 to 60° C. are in an atmosphere having a temperature of higher than the melting point of the copolymer by 60° C. or more for a distance of 15 to 50 cm from the spinneret. In such a case, a fiber having a high tensile strength and a high tensile elongation is obtained. However, the fibers obtained in examples of PTL 1 had single yarn finenesses of 2 denier or more, and no fiber was obtained which had a smaller single yarn fineness and had a high strength and a high elongation.

On the other hand, in examples of U.S. Pat. No. 6,005,019 (PTL 2), yarns made of a poly(glycolide-lactide) copolymer were produced by keeping filaments in an atmosphere having a temperature of 110° C. with heating to 100° C. near an outlet of a spinneret. However, the drawn yarn produced by keeping the filaments in an atmosphere having a temperature of 110° C. with the heating to 100° C. near the outlet of the spinneret is still insufficient in single yarn fineness and in tensile elongation.

CITATION LIST

Patent Literature

[PTL 1] Japanese Unexamined Patent Application Publication No. 2004-250853
[PTL 2] U.S. Pat. No. 6,005,019

SUMMARY OF INVENTION

Technical Problem

The present invention has been made in view of the above-described problems of the conventional technologies, and an object of the present invention is to provide an undrawn polyglycolic acid-based resin yarn good in releasing property and in stretchability irrespective of an operational environment temperature at production and of a temperature and a humidity at storage, a drawn polyglycolic acid-based resin yarn which is obtained by drawing the undrawn yarn and which has a small single yarn fineness and has a high strength and a high elongation, and production methods thereof.

Solution to Problem

The present inventors have conducted earnest study to achieve the above-described object. As a result, the present inventors have found the following facts. Specifically, when a fibrous polyglycolic acid-based resin discharged through a spinneret is kept in an atmosphere having a temperature of not lower than 110.5° C. but not higher than the melting point of the polyglycolic acid-based resin for a predetermined period after the discharge, an undrawn polyglycolic acid-based resin yarn good in releasing property and in stretchability can be obtained. In addition, a drawn polyglycolic acid-based resin yarn having a small single yarn fineness and having a high strength and a high elongation can be obtained by drawing the undrawn yarn. These findings have led to the completion of the present invention.

Specifically, a method for producing an undrawn polyglycolic acid-based resin yarn of the present invention comprises:

a discharge step of discharging a molten polyglycolic acid-based resin through a spinneret, to thereby form a fibrous polyglycolic acid-based resin;

a keeping step of keeping the fibrous polyglycolic acid-based resin for 0.0012 seconds or more after the discharge in an atmosphere having a temperature of not lower than 110.5° C. but not higher than a melting point of the polyglycolic acid-based resin; and a cooling step of cooling the fibrous polyglycolic acid-based, resin obtained in the keeping step, to thereby obtain an undrawn polyglycolic acid-based resin yarn.

In the method for producing an undrawn polyglycolic acid-based resin yarn, the fibrous polyglycolic acid-based resin is particularly preferably taken up in the keeping step and the cooling step such that a single yarn constituting the undrawn polyglycolic acid-based resin yarn has a mass per unit length of $6 \times 10^{-4}$ g/m or more.

Moreover, an undrawn polyglycolic acid-based resin yarn of the present invention is obtained by such a method for producing an undrawn polyglycolic acid-based resin yarn, and has a dry heat shrinkage ratio at 100° C. of 55% or less and a tensile elongation of 150% or more immediately after production.

Meanwhile, a method for producing a drawn polyglycolic acid-based resin yarn of the present invention comprises a drawing step of drawing the undrawn polyglycolic acid-based resin yarn of the present invention. In addition, a drawn polyglycolic acid-based resin yarn of the present invention is obtained by such a method for producing a drawn polyglycolic acid-based resin yarn, and has a single yarn fineness of 1.9 denier or less, a tensile strength of 6.0 gf/denier or more, and a tensile elongation of 20% or more.

Meanwhile, a cut fiber of the present invention is obtained by a method for producing a cut fiber of the present invention which comprises a cutting step of cutting the drawn polyglycolic acid-based resin yarn of the present invention.

Note that, in the present invention, the "releasing" of an undrawn yarn means that the undrawn yarn is released enough to be drawn, and specifically means that an undrawn yarn wound on a bobbin or the like or put in a can is released to a drawable unit (for example, individual yarn).

Advantageous Effects of Invention

According to the present invention, it is possible to obtain a drawn polyglycolic acid-based resin yarn having a small single yarn fineness, a high strength, and a high elongation.

DESCRIPTION OF EMBODIMENTS

Hereinafter, the present invention will be described in detail on the basis of preferred embodiments thereof.

A method for producing an undrawn polyglycolic acid-based resin yarn of the present invention includes: a discharge step of discharging a molten polyglycolic acid-based resin through a spinneret, to thereby form a fibrous polyglycolic acid-based resin; a keeping step of keeping the fibrous polyglycolic acid-based resin in an atmosphere having a predetermined temperature for a predetermined period after the discharge; and a cooling step of cooling the fibrous polyglycolic acid-based resin obtained in the keeping step, to thereby obtain an undrawn polyglycolic acid-based resin yarn.

(Polyglycolic Acid-Based Resin)

First, the polyglycolic acid-based resin (hereinafter, referred to as a "PGA-based resin") used in the present invention is described. Examples of the PGA-based resin include homopolymers of glycolic acid (hereinafter, referred to as "PGA homopolymers," and including ring-opening polymers of glycolide, which is a cyclic ester derived from two molecules of glycolic acid) constituted of only a glycolic acid repeating unit represented by the following formula (1):

—[O—CH$_2$—C(=O)]—    (1), polyglycolic acid copolymers (hereinafter, referred to as "PGA copolymers") comprising the glycolic acid repeating unit, and the like. One of such PGA-based resins may be used alone, or two or more thereof may be used in combination.

The PGA homopolymer can be synthesized by dehydration polycondensation of glycolic acid, dealcoholization polycondensation of a glycolic acid alkyl ester, ring-opening polymerization of glycolide, or the like. Preferably, the PGA homopolymer is synthesized by ring-opening polymerization of glycolide. Note that such ring-opening polymerization can be conducted as bulk polymerization or solution polymerization.

Meanwhile, the PGA copolymer can be synthesized by using a comonomer in combination in such a polycondensation reaction or a ring-opening polymerization reaction. Examples of the comonomer include cyclic monomers such as ethylene oxalate (i.e., 1,4-dioxane-2,3-dione), lactides, lactones (for example, β-propiolactone, β-butyrolactone, β-pivalolactone, γ-butyrolactone, δ-valerolactone, β-methyl-δ-valerolactone, ε-caprolactone, and the like), carbonates (for example, trimethylene carbonate and the like), ethers (for example, 1,3-dioxane and the like), ether esters (for example, dioxanone and the like), and amides (s-caprolactam and the like); hydroxycarboxylic acids including lactic acid, 3-hydroxypropanoic acid, 3-hydroxybutanoic acid, 4-hydroxybutanoic acid, 6-hydroxycaproic acid, and the like, and alkyl esters thereof; substantially equimolar mixtures of an aliphatic diol such as ethylene glycol or 1,4-butanediol with an aliphatic dicarboxylic acid such as succinic acid or adipic acid or an alkyl ester thereof. One of these comonomers may be used alone, or two or more thereof may be used in combination.

Examples of a catalyst used when the PGA-based resin is produced by ring-opening polymerization of glycolide include known ring-opening polymerization catalysts including tin-based compounds such as tin halides and organic tin carboxylates; titanium-based compounds such as alkoxy titanates; aluminum-based compounds such as alkoxy aluminums; zirconium-based compounds such as zirconium acetylacetonate; and antimony-based compounds such as antimony halides and antimony oxide.

The PGA-based resin can be produced by a conventionally known polymerization method. A temperature for the polymerization is preferably 120 to 300° C., more preferably 130 to 250° C., and particularly preferably 140 to 220° C. If the polymerization temperature is lower than the lower limit, the polymerization tends to proceed insufficiently. Meanwhile, if the polymerization temperature exceeds the upper limit, the produced resin tends to be thermally decomposed.

Meanwhile, a time for the polymerization of the PGA-based resin is preferably 2 minutes to 50 hours, more preferably 3 minutes to 30 hours, and particularly preferably 5 minutes to 18 hours. If the polymerization time is less than the lower limit, the polymerization tends to proceed insufficiently. Meanwhile, if the polymerization time exceeds the upper limit, the produced resin tends to be too colored.

The content of the glycolic acid repeating unit represented by the above-described formula (1) in the PGA-based resin used in the present invention is preferably 70% by mass or more, more preferably 80% by mass or more, further preferably 90% by mass or more, and particularly preferably 100% by mass. If the content of the glycolic acid repeating unit is less than the lower limit, effects of the PGA-based resin such as biodegradability, hydrolyzability, biocompatibility, mechanical strength, and heat resistance tend to decrease.

The PGA-based resin has a weight average molecular weight of preferably $5 \times 10^4$ to $80 \times 10^4$, and more preferably $8 \times 10^4$ to $50 \times 10^4$. If the weight average molecular weight of the PGA-based resin is less than the lower limit, the mechanical strength of the obtained drawn PGA-based resin yarn tends to be lowered. Meanwhile, if the weight average molecular weight exceeds the upper limit, it tends to be difficult to discharge the molten PGA-based resin. Note that the weight average molecular weight is a value determined by gel permeation chromatography (GPC) with respect to polymethyl methacrylate.

In addition, the PGA-based resin has a melt viscosity (temperature: 240° C., shear rate: 122 sec$^{-1}$) of preferably 1 to 10000 Pa·s, more preferably 100 to 6000 Pa·s, and particularly preferably 300 to 4000 Pa·s. If the melt viscosity is less than the lower limit, spinning property tends to deteriorate, and partial yarn break tends to occur. Meanwhile, if the melt viscosity exceeds the upper limit, it tends to be difficult to discharge the molten PGA-based resin.

In the present invention, such a PGA-based resin may be used alone, or, if necessary, various additives such as a heat stabilizer, an end-capping agent, a plasticizer, and an ultraviolet absorber, as well as other thermoplastic resins may be added to the PGA-based resin.

<Method for Producing Undrawn PGA-Based Resin Yarn>

Next, a preferred embodiment of a method for producing an undrawn PGA-based resin yarn of the present invention will be described in detail with reference to the drawings. However, the method for producing an undrawn PGA-based resin yarn of the present invention is not limited by the drawings. Note that, in the following descriptions and drawings, the same or corresponding components are denoted by the same reference signs, and overlapping descriptions thereof are omitted.

The method for producing an undrawn PGA-based resin yarn of the present invention includes: a discharge step of discharging a molten PGA-based resin through a spinneret, to thereby form a fibrous PGA-based resin; a keeping step of keeping the fibrous PGA-based resin in an atmosphere having a predetermined temperature for a predetermined period after the discharge; and a cooling step of cooling the fibrous PGA-based resin obtained in the keeping step, to thereby obtain an undrawn PGA-based resin yarn.

The molten PGA-based resin can be prepared by melt-kneading using an extruder or the like. For example, when the undrawn PGA-based resin yarn is produced by using a melt spinning apparatus shown in FIG. 1, a PGA-based resin in the form of pellets or the like is fed into an extruder 2 through a raw material hopper 1, and the PGA-based resin is melt kneaded.

A temperature for melting the PGA-based resin is preferably 200 to 300° C., and more preferably 210 to 270° C. If the temperature for melting the PGA-based resin is lower than the lower limit, it tends to be difficult to form the fibrous PGA-based resin, because the flowability of the PGA-based resin decreases and hence the PGA-based resin is not discharged through the spinneret. Meanwhile, if the temperature exceeds the upper limit, the PGA-based resin tends to be too colored, or thermally decomposed.

In such melt-kneading, a mixer, a continuous kneader, or the like can be used instead of the extruder. It is preferable to use an extruder from the viewpoint that the treatment can be performed in a short period, and the process can smoothly proceed to the subsequent discharge step.

(Discharge Step)

In the discharge step according to the present invention, the molten PGA-based resin prepared as described above is discharged through a spinneret. Thus, the fibrous PGA-based resin is formed. For example, in the melt spinning apparatus shown in FIG. 1, the molten PGA-based resin is transferred from the extruder 2 to a spinneret 4 by using a gear pump 3, while being quantified. The PGA-based resin is discharge through holes of the spinneret 4, to thereby form the fibrous PGA-based resin. The spinneret is not particularly limited, but a known spinneret can be used. The number of holes of the spinneret and the diameter of the holes are not particularly limited.

A temperature (a temperature of the spinneret) for discharging the molten PGA-based resin is preferably 210 to 280° C., and more preferably 235 to 268° C. If the discharge temperature is lower than the lower limit, it tends to be difficult to form the fibrous PGA-based resin, because the flowability of the PGA-based resin decreases and hence the PGA-based resin is not discharged through the spinneret. Meanwhile, if the discharge temperature exceeds the upper limit, the PGA-based resin tends to be too colored, or thermally decomposed.

(Keeping Step)

Next, the fibrous PGA-based resin formed in the discharge step is kept for 0.0012 seconds or more after the discharge in an atmosphere having a temperature of not lower than 110.5° C. but not higher than a melting point of the PGA-based resin. A method for the keeping is not particularly limited. In general, the keeping is conducted by passing the fibrous PGA-based resin through the atmosphere having the temperature over the predetermined period. When the fibrous PGA-based resin is kept in the atmosphere having the temperature for the predetermined period after the discharge in this manner, the undrawn PGA-based resin yarn immediately after the production thereof has a small dry heat shrinkage ratio at 100° C. and a high tensile elongation, and exhibits an excellent releasing property. In addition, such an undrawn PGA-based resin yarn is excellent in releasing property, even after being exposed to an atmosphere having high temperature and high humidity of a temperature of 40° C. and a relative humidity of 80% RH. Moreover, when the undrawn PGA-based resin yarn obtained through the keeping step according to the present invention is drawn, a drawn PGA-based resin yarn can be obtained which has a small single yarn fineness, a high tensile strength, and a high tensile elongation, both immediately after the production and after exposure to the atmosphere having the high temperature and high humidity.

In the keeping step according to the present invention, the time for which the fibrous PGA-based resin is kept in the atmosphere having the temperature according to the present invention is 0.0012 seconds or more. The time is preferably 0.0015 seconds or more, from the viewpoint that the undrawn PGA-based resin yarn has a lower dry heat shrinkage ratio at 100° C. immediately after the production, and has a higher tensile elongation both immediately after the production and after exposure to the atmosphere having the high temperature and high humidity, and also from the viewpoint that the drawn PGA-based resin yarn is obtained which has a smaller single yarn fineness, a higher tensile strength, and a higher tensile elongation, when the undrawn PGA-based resin yarn is drawn either immediately after the production or after exposure to the atmosphere having the high temperature and high humidity. Moreover, the upper limit of the keeping time is not particularly limited, but the keeping time is preferably 0.9 seconds or less and more preferably 0.09 seconds or less from the viewpoint of spinnability. In the keeping step according to the present invention, the temperature is kept by using a heat insulation cylinder having a heating function (hereinafter, referred to as a "heating mantle"). The keeping time can be adjusted by changing the length of the heating mantle or changing the setting temperature of the heating mantle to change the region (in particular, the length in the direction in which the fibrous PGA-based resin is transferred) of the atmosphere having the temperature according to the present invention, or by changing the amount of the PGA-based resin discharged or the spinning speed (take-up speed).

On the other hand, if the time for which the fibrous PGA-based resin is kept in the atmosphere having the temperature according to the present invention is less than 0.0012 seconds (including a case where the fibrous PGA-based resin is kept in an atmosphere having a temperature lower than 110.5° C. immediately after the discharge), the obtained undrawn PGA-based resin yarn, in general, has a large dry heat shrinkage ratio at 100° C. immediately after production, and has a low tensile elongation and a poor releasing property both immediately after the production and after exposure to the atmosphere having the high temperature and high humidity, except that if a spinning speed is lowered, the undrawn PGA-based resin yarn is sometime obtained which has a small dry heat shrinkage ratio at 100° C. immediately after production, and has a high tensile elongation and an excellent releasing property both immediately after the production and after exposure to the atmosphere having the high temperature and high humidity. In addition, a drawn PGA-based resin yarn obtained by drawing the undrawn PGA-based resin yarn has a large single yarn fineness and has a low tensile strength and a low tensile elongation in either case.

Meanwhile, when the fibrous PGA-based resin discharged through the spinneret is kept in an atmosphere having a temperature exceeding the melting point of the PGA-based resin immediately after the discharge, it can be expected, based on PTL 1, that a drawn PGA-based resin yarn having a high tensile strength and a high tensile elongation can be obtained. In addition, it can also be expected that the undrawn PGA-based resin yarn has a low dry heat shrinkage ratio at 100° C. immediately after production, and has a high tensile elongation and an excellent releasing property both immediately after the production and after exposure to the atmosphere having the high temperature and high humidity. However, if the fibrous PGA-based resin is kept under the above-described condition, the resin discharged through the spinneret tends to undergo partial yarn break during a period before the resin has been taken up, resulting in a poor productivity.

Note that although it is not exactly clear why the releasing property of the undrawn polyglycolic acid-based resin yarn of the present invention is improved, the present inventors speculate as follows. Specifically, the undrawn PGA-based resin yarn of the present invention is obtained by discharging the molten PGA-based resin through the spinneret, and then keeping the discharged, PGA-based resin in the atmosphere having a temperature of not lower than 110.5° C. but not higher than a melting point of the PGA-based resin for the predetermined period. Hence, the orientation in the amorphous portion is presumably relaxed. Presumably, the undrawn PGA-based resin yarn in which the orientation of the amorphous portion is thus relaxed is less likely to be entangled because the shrinkage of the PGA-based resin which occurs with time due to influences of an operational environment temperature, and a temperature and a humidity during the storage or the like is suppressed. For this reason, the undrawn PGA-based resin yarn presumably exhibits an excellent releasing property.

On the other hand, in the conventional undrawn PGA-based resin yarns obtained by discharging a molten PGA-based resin through a spinneret and then rapidly cooling the discharged PGA-based resin, the amorphous portion is highly oriented, and hence the undrawn PGA-based resin yarns are entangled when the shrinkage of the PGA-based resin occurs with time due to influences of an operational environment temperature, and a temperature and a humidity during the storage or the like. Presumably this is why the releasing property deteriorates.

A method for creating the atmosphere having the temperature according to the present invention is not particularly limited, as long as the fibrous PGA-based resin discharged through the spinneret is immediately kept in the atmosphere having the temperature. For example, in the melt spinning apparatus shown in FIG. 1, the atmosphere having the temperature according to the present invention is created by attaching a heating mantle 5 immediately below the spinneret 4 (discharge port), and, if necessary, heating the inside of the heating mantle.

In the atmosphere having the temperature according to the present invention, the temperature does not always have to be constant, and a temperature distribution may be present. In the melt spinning apparatus shown in FIG. 1, for example, a temperature distribution may be present in the heating mantle, as long as an atmosphere having a temperature of not lower than 110.5° C. but not higher than the melting point of the PGA-based resin is created in the heating mantle. Such a temperature (temperature distribution) in the heating mantle can be measured by using an infrared laser thermometer or the like. By this measurement, whether or not the atmosphere having the temperature according to the present invention is created in the heating mantle can be checked.

An example of the method for creating the atmosphere having the temperature according to the present invention is a method in which the inside of the heating mantle is heated, such that the highest temperature in the heating mantle can be not higher than the melting point of the PGA-based resin and the temperature near the outlet of the heating mantle can be not lower than 110.5° C. Note that, in the method for producing an undrawn PGA-based resin yarn of the present invention, the temperature near the outlet of the heating mantle does not always have to be not lower than 110.5° C., but the temperature near the outlet of the heating mantle may be 100° C. or below, as long as the fibrous PGA-based resin can be kept in the atmosphere having the temperature according to the present invention for the predetermined period.

A setting temperature of the heating mantle is not particularly limited, as long as the atmosphere having the temperature according to the present invention is created. For example, when the temperature of the heating mantle is set to 100° C., a temperature distribution is formed where the temperature gets lower in the direction in which the fibrous PGA-based resin is transferred, and hence the atmosphere having a temperature of not lower than 110.5° C. cannot be created from the outlet of the spinneret to the vicinity of the outlet of the heating mantle. For this reason, the temperature of the heating mantle needs to be set to 110° C. or above, and preferably 120° C. or above, in general.

In the keeping step according to the present invention, the fibrous PGA-based resin formed in the discharge step is kept in the atmosphere having the temperature according to the present invention, while being taken up, in general. A take-up speed (a spinning speed) of the fibrous PGA-based resin is not particularly limited. The fibrous PGA-based resin is particularly preferably taken up at such a take-up speed that a single yarn (hereinafter, referred to as "undrawn PGA-based resin single yarn") constituting the obtained undrawn PGA-based resin yarn has a mass per unit length of $6 \times 10^{-4}$ g/m or more (more preferably, $13 \times 10^{-4}$ g/m or more). In such a case, the undrawn PGA-based resin yarn tends to have a smaller dry heat shrinkage ratio at 100° C. and a higher tensile elongation immediately after production, and tends to be good in releasing property and in stretchability even after exposure to the atmosphere having the high temperature and high humidity. In addition, the drawn PGA-based resin yarn tends to be further improved in tensile strength and tensile elongation. Note that the mass per unit length of the undrawn PGA-based resin single yarn varies depending also on the diameter of the hole of the spinneret, the amount discharged per hole of the spinneret, or the like. Hence, the take-up speed is set in consideration of these factors, so that the undrawn PGA-based resin single yarn can have a desired mass per unit length.

(Cooling Step)

Next, the fibrous PGA-based resin obtained in the keeping step is cooled to obtain an undrawn PGA-based resin yarn of the present invention. In general, this cooling treatment is performed, while the fibrous PGA-based resin is being taken up. In addition, a method for cooling the fibrous PGA-based resin is not particularly limited, but is preferably an air-cooling method because of its simplicity.

In the cooling step, it is particularly preferable to take up the fibrous PGA-based resin, such that the undrawn PGA-based resin single yarn has a mass per unit length of $6 \times 10^{-4}$ g/m or more (more preferably, $13 \times 10^{-4}$ g/m or more), subsequent to the keeping step. In such a case, the undrawn PGA-based resin yarn tends to have a smaller dry heat shrinkage ratio at 100° C. and a higher tensile elongation immediately after production, and tends to be good in releasing property and in stretchability even after exposure to the atmosphere having the high temperature and high humidity. In addition, the drawn PGA-based resin yarn tends to be further improved in tensile strength and tensile elongation.

The thus obtained undrawn PGA-based resin yarn of the present invention is wound on a bobbin 9 or the like, after an oiling agent for fiber is applied thereto in order to further improve the releasing property of the undrawn PGA-based resin yarn, if necessary.

<Undrawn PGA-Based Resin Yarn>

Since the undrawn PGA-based resin yarn of the present invention obtained by the production method of the present invention is excellent in releasing property, the undrawn PGA-based resin yarn can be released easily in the production of the drawn PGA-based resin yarn, even when the undrawn PGA-based resin yarn is wound on a bobbin or the like as described above. In addition, the undrawn PGA-based resin yarn of the present invention is also excellent in releasing property after the storage, and particularly releasing property after the storage at high temperature and high humidity (for example, at a temperature of 40° C. and a relative humidity of 80% RH). Hence, the undrawn PGA-based resin yarn of the present invention can be released easily in the production of the drawn PGA-based resin yarn, even when stored (for example, stored at 20 to 40° C.) in a state of being wound on a bobbin or the like. Hence, the undrawn PGA-based resin yarn of the present invention can be produced and stored in a large quantity, and further can be supplied stably. This makes it possible to adjust production of the drawn PGA-based resin yarn. In addition, since the undrawn PGA-based resin yarn of the present invention does not have to be stored at low temperature, production costs (storage costs) in the production of the drawn PGA-based resin yarn can be reduced.

In addition, the undrawn PGA-based resin yarn of the present invention has a small dry heat shrinkage ratio at 100° C. of 55% or less and a large tensile elongation of 150% or more immediately after production. If the dry heat shrinkage ratio exceeds the upper limit, or if the tensile elongation is less than the lower limit, the releasing property of the undrawn PGA-based resin yarn deteriorates, and the drawing cannot be performed because of poor ability of taking out, or a drawn PGA-based resin yarn obtained by drawing such an undrawn PGA-based resin yarn tends to have a large single yarn fineness and a low tensile strength. In addition, from the viewpoint that the drawn PGA-based resin yarn obtained by drawing the undrawn PGA-based resin yarn of the present invention has a higher tensile strength and a higher tensile elongation, the undrawn PGA-based resin yarn more preferably has a dry heat shrinkage ratio at 100° C. of 45% or less and a tensile strength of 200% or more immediately after production.

<Method for Producing Drawn PGA-Based Resin Yarn>

Next, a method for producing a drawn PGA-based resin yarn of the present invention will be described in detail. The method for producing a drawn PGA-based resin yarn of the present invention includes a drawing step of drawing the undrawn PGA-based resin yarn of the present invention produced as described above. A method for the drawing is not particularly limited, but a known method can be employed. For example, when the drawn PGA-based resin yarn is produced by using the drawing apparatus shown in FIG. 2, the drawn PGA-based resin yarn of the present invention can be obtained by taking out with releasing the undrawn PGA-based resin yarn of the present invention wound on the bobbin 9 or the like, and then drawing the undrawn PGA-based resin yarn. In the method for producing a drawn PGA-based resin yarn of the present invention, the drawing temperature and the draw ratio are not particularly limited, and can be set as appropriate depending on the desired physical properties and the like of the drawn PGA-based resin yarn. For example, the drawing temperature is preferably 40 to 120° C., and the draw ratio is preferably 1.1 to 8.0.

<Drawn PGA-Based Resin Yarn>

The undrawn PGA-based resin yarn of the present invention can be drawn at a relatively high draw ratio. Hence, the drawn PGA-based resin yarn of the present invention obtained by drawing the undrawn PGA-based resin yarn has a small single yarn fineness of 1.9 denier or less (preferably 1.7 denier or less), a high tensile strength of 6.0 gf/denier or more (preferably 7.0 gf/denier or more), and a high tensile elongation of 20% or more (preferably 21% or more). A new fiber product having a high strength, a high elongation, and a readily biodegradable ability can be designed by using such a drawn PGA-based resin yarn having a small single yarn fineness, a high strength, and a high elongation.

<Cut Fiber>

A cut fiber of the present invention is obtained by cutting the drawn PGA-based resin yarn of the present invention produced as described above. A method for cutting the drawn PGA-based resin yarn is not particularly limited, but a cutting method used in a known method for producing a cut fiber can be employed.

EXAMPLES

Hereinafter, the present invention will be described more specifically on the basis of Examples and Comparative Examples. However, the present invention is not limited to Examples below. Note that methods for evaluating an undrawn yarn and a drawn yarn are shown below.

(1) Dry Heat Shrinkage Ratio

A hank was obtained by winding 100 m of an undrawn yarn on a rewinder having an outer perimeter of 1 m. One end of the obtained hank was fixed, and a 20-g weight was hung from the other end. In this condition, the length L of the hank was measured. Next, the weight was unhung, and the hank was dangled in a dry heat furnace controlled at 100° C., and left for 30 minutes. Then, the hank was cooled to room temperature. After that, one end of the hank was fixed again, and a 20-g weight was hung from the other end. The length $L_{HT}$ of the hank was measured, and the dry heat shrinkage ratio (%) was calculated according to the following formula:

$$\text{Dry heat shrinkage ratio } (\%) = (L - L_{HT})/L \times 100$$

Here, L represents the length (m) of the hank before the heat treatment, and $L_{HT}$ represents the length (m) of the hank after the heat treatment.

(2) Tensile Strength and Tensile Elongation

An undrawn yarn having a length of 120 mm or a drawn yarn having a length of 250 mm was mounted on a high-precision universal testing machine ("TENSILON" manufactured by A&D Company, Limited) equipped with chucks for hooking a tire cord, and a tensile test was carried out at a cross-head speed of 300 mm/min to measure the strength and the elongation at breakage of the yarn. This measurement was conducted on five undrawn yarns or drawn yarns, and the average values thereof were regarded as the tensile strength and the tensile elongation. Note that the measurement environment was controlled at a temperature of 23° C. and a relative humidity of 50% RH.

(3) Releasing Property

Figure 2:
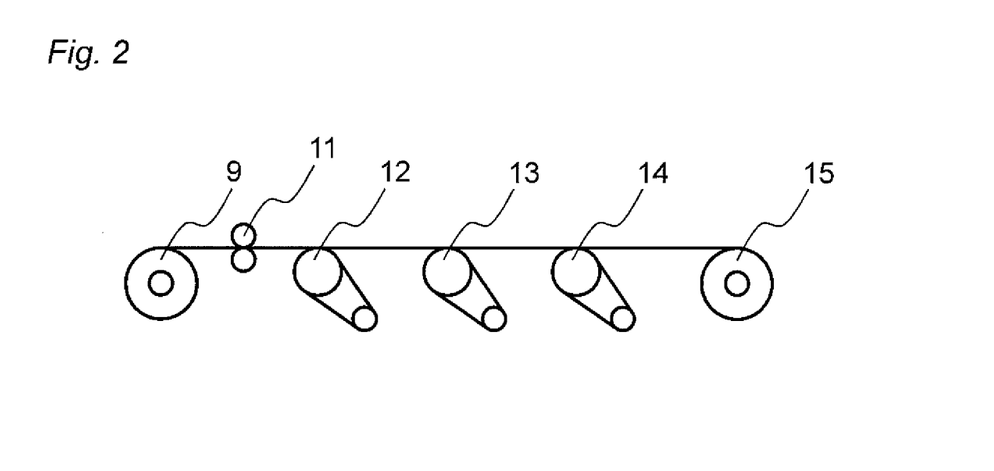
FIG. 2 is a schematic diagram showing a drawing apparatus used in Examples and Comparative Examples.

A bobbin on which an undrawn yarn was wound was mounted on the drawing apparatus shown in FIG. 2. The undrawn yarn was released, taken out from the bobbin 9 through a feeding roller 11 by using a first heating roller 12 operated at a temperature of 65° C. and a peripheral speed of 100 m/min, drawn between the first heating roller 12 and a second heating roller 13 operated at a temperature of 90° C., and wound on a bobbin 15 through a third heating roller 14. Thus, a drawn yarn was obtained. The releasing property of the undrawn yarn at this time was evaluated on the basis of the following criteria.

A: No yarn break was observed, and the releasing property was uniform and good.

B: Although no yarn break was observed, yarns were in close contact with each other, and the releasing property was partially ununiform.

C: Yarn break occurred often, and the undrawn yarn was difficult to release and draw.

(4) Single Yarn Fineness

A hank was obtained by winding 90 m of an undrawn yarn on a rewinder having an outer perimeter of 1 m, and the absolute-dry mass M thereof was measured. The single yarn fineness thereof was calculated from the following formula:

$$\text{Single yarn fineness (denier)} = 100 \times M/H$$

Here, M represents the absolute-dry mass (g) of the drawn yarn and H represents the number (=24) of holes of the spinneret.

(5) Spinning Property

The state of the resin discharged through the spinneret was determined until the resin was taken up by the first take-up roller on the basis of the following criteria.

A: No yarn break was observed, which enabled stable production.

B: Yarn break, including partial yarn break, occurred for 60 minutes less than 5 times, which was problematic in stable production.

C: Yarn break, including partial yarn break, occurred for 60 minutes 5 times or more, which was extremely problematic in production.

Example 1

Production of Undrawn PGA Resin Yarn (a) and Evaluation Thereof

Figure 1:
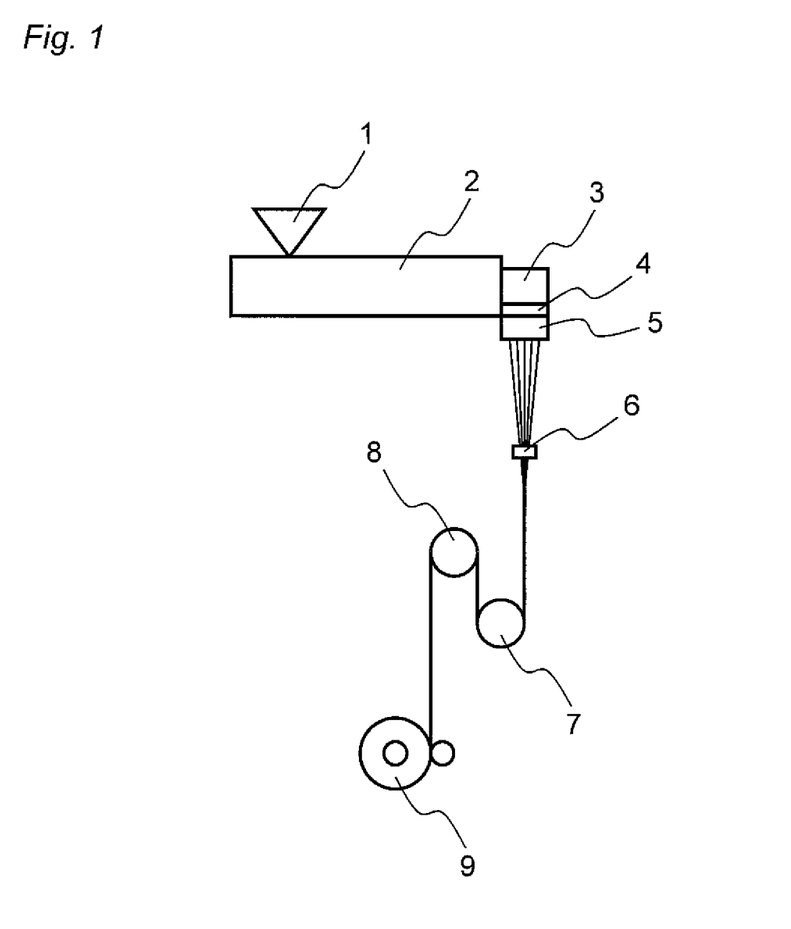
FIG. 1 is a schematic diagram showing a melt spinning apparatus used in Examples and Comparative Examples.

An undrawn PGA resin yarn was fabricated by using the melt spinning apparatus shown in FIG. 1. A heating mantle 5 which had a length of 150 mm and an inner diameter of 100 mm and whose temperature was controllable was mounted immediately below the spinneret 4 of the melt spinning apparatus. Note that, in the following descriptions and drawings, the same or corresponding components are denoted by the same reference signs, and overlapping descriptions therefor are omitted.

First, a pelletized PGA resin (manufactured by Kureha Corporation, weight average molecular weight: $20 \times 10^4$, melt viscosity (at a temperature of 240° C. and a shear rate of 122 sec$^{-1}$): 700 Pa·s, glass transition temperature: 43° C., melting point: 220° C., size: 3 mm in diameter×3 mm in length) was fed into a single screw extruder 2 having a cylinder diameter of 25 mm through a raw material hopper 1, and melt at 210 to 250° C. Note that the cylinder of the extruder 2 had 4 sections which were capable of being individually heated, and the temperatures of the sections were set to 210° C., 220° C., 235° C., and 250° C. from the hopper side, respectively. In addition, the head temperature, the gear pump temperature, and the spin pack temperature were set to 250° C.

A fibrous PGA resin was formed by discharging the molten PGA resin through a 24-hole spinneret 4 (hole diameter: 0.40 mm) with a gear pump 3 at a rate of 0.42 g/min per hole. Then, the fibrous PGA resin was allowed to pass through the heating mantle 5 set at 120° C. After that, the fibrous PGA resin was air cooled, and an oiling agent for fiber "Lurol" manufactured by Goulston Technologies Inc. was applied onto the obtained undrawn PGA resin yarn. Then, the undrawn PGA resin yarn (a-1) was taken up with a first take-up roller 7 operated at a peripheral speed of 300 m/min, and wound on bobbins 9 at 30000 m per bobbin through a second take-up roller 8. The dry heat shrinkage ratio at 100° C., the tensile elongation, and the releasing property of the obtained undrawn PGA resin yarn (a-1) was measured immediately after the production in accordance with the above-described evaluation methods. Table 1 shows the results thereof, as well as an evaluation result of spinning property.

<Production of Drawn PGA Resin Yarn (A) and Evaluation Thereof>

Immediately after the undrawn PGA resin yarn (a-1) was produced, the bobbin on which the undrawn PGA resin yarn (a-1) was wound was mounted on the drawing apparatus shown in FIG. 2. The undrawn PGA resin yarn (a-1) was released, and drawn by using a first heating roller 12 and a second heating roller 13 from the bobbin 9 through a feeding roller 11. The drawn PGA resin yarn (A-1) was wound on a bobbin 15 through a third heating roller 14. Note that the drawing temperature was set to 65° C., and the draw ratio was set to 6.5 by adjusting the peripheral speeds of the first and second heating rollers. The single yarn fineness, the tensile strength, and the tensile elongation of the obtained drawn PGA resin yarn (A-1) were measured in accordance with the above-described evaluation methods. Table 1 shows the results thereof.

<Storage of Undrawn PGA Resin Yarn (a) at High Temperature and High Humidity and Evaluation Thereof>

The bobbin on which the undrawn PGA resin yarn (a-1) was wound was placed in a constant temperature and humidity chamber ("HPAV-120-20" manufactured by ISUZU), and was stored in an atmosphere having a temperature of 40° C. and a relative humidity of 80% RH for 24 hours. After the storage, the tensile elongation and the releasing property of the undrawn PGA resin yarn (b-1) was measured in accordance with the above-described evaluation methods. Table 1 shows the results thereof.

<Production of Drawn PGA Resin Yarn (B) and Evaluation Thereof>

In addition, a drawn PGA resin yarn (B-1) was fabricated by performing drawing in the same manner as in the drawn PGA resin yarn (A-1), except that the undrawn PGA resin yarn (b-1) stored at high temperature and high humidity was used instead of the undrawn PGA resin yarn (a-1). The single yarn fineness, the tensile strength, and the tensile elongation of the drawn PGA resin yarn (B-1) were measured in accordance with the above-described evaluation methods. Table 1 shows the results thereof.

<Calculation of Keeping Time, Spinning Time, and Mass of Undrawn PGA Resin Single Yarn>

In each of Examples and Comparative Examples, the maximum distance from the outlet of the spinneret to a point P where the temperature was not lower than 110.5° C. was defined as an "effective heating mantle length," and determined as follows. Specifically, first, the temperature distribution in the heating mantle set at 120° C. during the discharge of the PGA resin was measured by using an infrared laser thermometer in the direction in which the PGA resin was discharged. As a result, the temperatures were 200° C., 170° C., and 130° C. at points where distances from the outlet of the spinneret were 10 mm, 60 mm, and 120 mm, respectively. Next, based on the temperature distribution, the point P was determined which was the most away from the outlet of the spinneret in the discharge direction, among points at which the temperature was not lower than 110.5° C. in the heating mantle. Then, the distance between the outlet of the spinneret and the point P was determined, and this distance was regarded as the "effective heating mantle length." The effective heating mantle length was 150 mm in Example 1.

The peripheral speed (300 m/min) of the first take-up roller was regarded as the spinning speed. Based on the effective heating mantle length, the time (second) was calculated for which the fibrous PGA resin was kept in the atmosphere having a temperature of not lower than 110.5° C. but not higher than the melting point of the PGA resin after the fibrous PGA resin was discharged through the spinneret. Table 1 shows the result.

Moreover, the spinning time (second) was calculated from the spinning speed and the distance (2 m) from the outlet of the spinneret to the bobbin. In addition, the mass (g/m) per unit length of the undrawn PGA resin single yarn was calculated from the spinning speed and the amount of the PGA resin discharged per hole. Table 1 also shows these results.

Examples 2 to 4

Undrawn PGA resin yarns (a-2), (a-3), and (a-4) were fabricated in the same manner as in Example 1, except that the peripheral speed (spinning speed) of the first take-up roller 7 was changed to 600 m/min, 900 m/min, and 1100 m/min, respectively. Immediately after the production, the physical properties of the undrawn PGA resin yarns (a-2), (a-3), and (a-4) were measured in accordance with the above-described evaluation methods. In addition, drawn PGA resin yarns (A-2), (A-3), and (A-4) were fabricated by performing drawing in the same manner as in Example 1, except that the undrawn PGA resin yarns (a-2), (a-3), and (a-4) were used instead of the undrawn PGA resin yarn (a-1). The physical properties thereof were measured in accordance with the above-described evaluation methods. Table 1 shows the results thereof.

Furthermore, the undrawn PGA resin yarns (a-2), (a-3), and (a-4) were stored in an atmosphere having a temperature of 40° C. and a relative humidity of 80% RH for 24 hours in the same manner as in Example 1, and the physical properties of the undrawn PGA resin yarns (b-2), (b-3), and (b-4) after the storage were measured in accordance with the above-described evaluation methods. In addition, drawn PGA resin yarns (B-2), (B-3), and (B-4) were fabricated by performing drawing in the same manner as in Example 1, except that the undrawn PGA resin yarns (b-2), (b-3), and (b-4) were used instead of the undrawn PGA resin yarn (b-1). The physical properties thereof were measured in accordance with the above-described evaluation methods. Table 1 shows the results thereof.

Note that the temperature distribution in the heating mantle during the discharge of the PGA resin was the same as that in Example 1. For each of the examples, the time for which the fibrous PGA resin was kept in the atmosphere having the predetermined temperature, the spinning time, and the mass per unit length of the undrawn PGA resin single yarn were calculated in the same manner as in Example 1. Table 1 also shows these results.

Example 5

An undrawn PGA resin yarn (a-5) was fabricated in the same manner as in Example 1, except that the setting temperature of the heating mantle was changed to 180° C. Immediately after the production, the physical properties of the undrawn PGA resin yarn (a-5) were measured in accordance with the above-described evaluation methods. In addition, a drawn PGA resin yarn (A-5) was fabricated by performing drawing in the same manner as in Example 1, except that the undrawn PGA resin yarn (a-5) was used instead of the undrawn PGA resin yarn (a-1). The physical properties thereof were measured in accordance with the above-described evaluation methods. Table 1 shows the results thereof.

Furthermore, the undrawn PGA resin yarn (a-5) was stored in an atmosphere having a temperature of 40° C. and a relative humidity of 80% RH for 24 hours in the same manner as in Example 1. The physical properties of the undrawn PGA resin yarn (b-5) after the storage were measured in accordance with the above-described evaluation methods. In addition, a drawn PGA resin yarn (B-5) was fabricated by performing drawing in the same manner as in Example 1, except that the undrawn PGA resin yarn (b-5) was used instead of the undrawn PGA resin yarn (b-1). The physical properties thereof were measured in accordance with the above-described evaluation methods. Table 1 shows the results thereof.

Note that the temperature distribution in the heating mantle during the discharge of the PGA resin was measured in the same manner as in Example 1. The temperatures were 220° C., 195° C., and 150° C. at the points where distances from the outlet of the spinneret were 10 mm, 60 mm, and 120 mm, respectively. The effective heating mantle length was determined from this temperature distribution in the same manner as in Example 1 to be 150 mm. From this value, the time for which the fibrous PGA resin was kept in the atmosphere having the predetermined temperature was calculated in the same manner as in Example 1. In addition, the spinning time and the mass per unit length of the undrawn PGA resin single yarn were calculated in the same manner as in Example 1. Table 1 also shows these results.

Examples 6 to 8

Undrawn PGA resin yarns (a-6), (a-7), and (a-8) were fabricated in the same manner as in Example 5, except that the peripheral speed (spinning speed) of the first take-up roller 7 was changed to 600 m/min, 900 m/min, and 1100 m/min, respectively. Immediately after the production, the physical properties of the undrawn PGA resin yarns (a-6), (a-7), and (a-8) were measured in accordance with the above-described evaluation methods. In addition, drawn PGA resin yarns (A-6), (A-7), and (A-8) were fabricated by performing drawing in the same manner as in Example 1, except that the undrawn PGA resin yarns (a-6), (a-7), and (a-8) were used instead of the undrawn PGA resin yarn (a-1). The physical properties thereof were measured in accordance with the above-described evaluation methods. Table 1 shows the results thereof.

Furthermore, the undrawn PGA resin yarns (a-6), (a-7), and (a-8) were stored in an atmosphere having a temperature of 40° C. and a relative humidity of 80% RH for 24 hours in the same manner as in Example 1. The physical properties of the undrawn PGA resin yarns (b-6), (b-7), and (b-8) after the storage were measured in accordance with the above-described evaluation methods. In addition, drawn PGA resin yarns (B-6), (B-7), and (B-8) were fabricated by performing drawing in the same manner as in Example 1, except that the undrawn PGA resin yarns (b-6), (b-7), and (b-8) were used instead of the undrawn PGA resin yarn (b-1). The physical properties thereof were measured in accordance with the above-described evaluation methods. Table 1 shows the results thereof.

Note that the temperature distribution in the heating mantle during the discharge of the PGA resin was the same as that in Example 5. For each of the examples, the time for which the fibrous PGA resin was kept in the atmosphere having the predetermined temperature, the spinning time, and the mass per unit length of the undrawn PGA resin single yarn were calculated in the same manner as in Example 1. Table 1 also shows these results.

Comparative Example 1

An undrawn PGA resin yarn (a-c1) was fabricated in the same manner as in Example 1, except that the heating mantle was not mounted. Immediately after the production, the physical properties of the undrawn PGA resin yarn (a-c1) were measured in accordance with the above-described evaluation methods. In addition, a drawn PGA resin yarn (A-c1) was fabricated by performing drawing in the same manner as in Example 1, except that the undrawn PGA resin yarn (a-c1) was used instead of the undrawn PGA resin yarn (a-1). The physical properties thereof were measured in accordance with the above-described evaluation methods. Table 2 shows the results thereof.

Furthermore, the undrawn PGA resin yarn (a-c1) was stored in an atmosphere having a temperature of 40° C. and a relative humidity of 80% RH for 24 hours in the same manner as in Example 1. The physical properties of the undrawn PGA resin yarn (b-c1) after the storage were measured in accordance with the above-described evaluation methods. In addition, a drawn PGA resin yarn (B-c1) was fabricated by performing drawing in the same manner as in Example 1, except that the undrawn PGA resin yarn (b-c1) was used instead of the undrawn PGA resin yarn (b-1). The physical properties thereof were measured in accordance with the above-described evaluation methods. Table 2 shows the results thereof.

Note that since the heating mantle was not mounted, the temperature of the atmosphere near the outlet of the spinneret was room temperature (23° C.). Hence, the time for which the fibrous PGA resin was kept in the atmosphere having the predetermined temperature was regarded as 0 seconds. In addition, the spinning time and the mass per unit length of the undrawn PGA resin single yarn were calculated in the same manner as in Example 1. Table 2 shows the results thereof.

Comparative Examples 2 to 4

Undrawn PGA resin yarns (a-c2), (a-c3), and (a-c4) were fabricated in the same manner as in Comparative Example 1, except that the peripheral speed (spinning speed) of the first take-up roller 7 was changed to 600 m/min, 900 m/min, and 1100 m/min, respectively. Immediately after the production, the physical properties of the undrawn PGA resin yarns (a-c2), (a-c3), and (a-c4) were measured in accordance with the above-described evaluation methods. In addition, drawn PGA resin yarns (A-c2), (A-c3), and (A-c4) were fabricated by performing drawing in the same manner as in Example 1, except that the undrawn PGA resin yarns (a-c2), (a-c3), and (a-c4) were used instead of the undrawn PGA resin yarn (a-1). The physical properties thereof were measured in accordance with the above-described evaluation methods. Table 2 shows the results thereof.

Furthermore, the undrawn PGA resin yarns (a-c2), (a-c3), and (a-c4) were stored in an atmosphere having a temperature of 40° C. and a relative humidity of 80% RH for 24 hours in the same manner as in Example 1. The physical properties of the undrawn PGA resin yarns (b-c2), (b-c3), and (b-c4) after the storage were measured in accordance with the above-described evaluation methods. In addition, drawn PGA resin yarns (B-c2), (B-c3), and (B-c4) were fabricated by performing drawing in the same manner as in Example 1, except that the undrawn PGA resin yarns (b-c2), (b-c3), and (b-c4) were used instead of the undrawn PGA resin yarn (b-1). The physical properties thereof were measured in accordance with the above-described evaluation methods. Table 2 shows the results thereof.

Note that since the heating mantle was not mounted, the time for which the fibrous PGA resin was kept in the atmosphere having the predetermined temperature was regarded as 0 seconds, in the same manner as in Comparative Example 1. In addition, the spinning time and the mass per unit length of the undrawn PGA resin single yarn were calculated in the same manner as in Example 1. Table 2 shows the results thereof.

Comparative Example 5

An undrawn PGA resin yarn (a-c5) was fabricated in the same manner as in Example 1, except that the setting temperature of the heating mantle was changed to 100° C. Immediately after the production, the physical properties of the undrawn PGA resin yarn (a-c5) were measured in accordance with the above-described evaluation methods. In addition, a drawn PGA resin yarn (A-c5) was fabricated by performing drawing in the same manner as in Example 1, except that the undrawn PGA resin yarn (a-c5) was used instead of the undrawn PGA resin yarn (a-1). The physical properties thereof were measured in accordance with the above-described evaluation methods. Table 2 shows the results thereof.

Furthermore, the undrawn PGA resin yarn (a-c5) was stored in an atmosphere having a temperature of 40° C. and a relative humidity of 80% RH for 24 hours in the same manner as in Example 1. The physical properties of the undrawn PGA resin yarn (b-c5) after the storage were measured in accordance with the above-described evaluation methods. In addition, a drawn PGA resin yarn (B-c5) was fabricated by performing drawing in the same manner as in Example 1, except that the undrawn PGA resin yarn (b-c5) was used instead of the undrawn PGA resin yarn (b-1). The physical properties thereof were measured in accordance with the above-described evaluation methods. Table 2 shows the results thereof.

Note that the temperature distribution in the heating mantle during the discharge of the PGA resin was measured in the same manner as in Example 1. The temperatures were 111° C., 95° C., 75° C., and 40° C. at points where distances from the outlet of the spinneret were 5 mm, 10 mm, 60 mm, and 120 mm, respectively. The effective heating mantle length was determined from this temperature distribution in the same manner as in Example 1 to be 5 mm. From this value, the time for which the fibrous PGA resin was kept in the atmosphere having the predetermined temperature was calculated in the same manner as in Example 1. In addition, the spinning time and the mass per unit length of the undrawn PGA resin single yarn were calculated in the same manner as in Example 1. Table 2 also shows these results.

Comparative Example 6

An undrawn PGA resin yarn (a-c6) was fabricated in the same manner as in Example 1, except that the setting temperature of the heating mantle was changed to 280° C. However, yarn break occurred during the taking-up of the resin discharged through the spinneret, and the undrawn PGA resin yarn was difficult to obtain stably. Hence, the spinning property was determined to be C. Note that the temperature near the outlet of the spinneret was a temperature exceeding the melting point (220° C.) of the PGA resin. Hence, since the PGA resin discharged through the spinneret was not kept in the atmosphere having the predetermined temperature immediately after the discharge, and the keeping time was regarded as 0 seconds.

TABLE 1

| | | Example | | | | | | | |
|---|---|---|---|---|---|---|---|---|---|
| | | 1 | 2 | 3 | 4 | 5 | 6 | 7 | 8 |
| Production conditions | Setting temperature of heating mantle (° C.) | 120 | 120 | 120 | 120 | 180 | 180 | 180 | 180 |
| | Spinning speed (m/min) | 300 | 600 | 900 | 1100 | 300 | 600 | 900 | 1100 |
| | Keeping time (seconds) | 0.030 | 0.015 | 0.010 | 0.008 | 0.030 | 0.015 | 0.010 | 0.008 |
| | Spinning time (seconds) | 0.40 | 0.20 | 0.13 | 0.11 | 0.40 | 0.20 | 0.13 | 0.11 |
| | Mass per unit length of undrawn PGA resin single yarn (g/m) | $13.6 \times 10^{-4}$ | $6.8 \times 10^{-4}$ | $4.5 \times 10^{-4}$ | $3.7 \times 10^{-4}$ | $13.6 \times 10^{-4}$ | $6.8 \times 10^{-4}$ | $4.5 \times 10^{-4}$ | $3.7 \times 10^{-4}$ |
| | Spinning property | A | A | A | A | A | A | A | A |
| Immediately after production | Undrawn yarn — Dry heat shrinkage ratio at 100° C. (%) | 24.9 | 43.8 | 50.6 | 53.5 | 19.9 | 38.2 | 46.6 | 50.8 |
| | Undrawn yarn — Tensile elongation (%) | 416 | 228 | 185 | 152 | 479 | 318 | 197 | 181 |
| | Undrawn yarn — Releasing property | A | A | A | A | A | A | A | A |
| | Drawn yarn — Single yarn fineness (denier) | 1.67 | 1.53 | 1.51 | 1.52 | 1.57 | 1.50 | 1.51 | 1.51 |
| | Drawn yarn — Tensile strength (gf/denier) | 7.5 | 7.9 | 7.2 | 7.1 | 8.3 | 7.8 | 7.6 | 7.6 |
| | Drawn yarn — Tensile elongation (%) | 25 | 24 | 22 | 22 | 23 | 24 | 22 | 22 |
| After storage at high temp. and high humid. | Undrawn yarn — Tensile elongation (%) | 273 | 180 | 117 | 111 | 359 | 225 | 160 | 155 |
| | Undrawn yarn — Releasing property | A | A | A | A | A | A | A | A |
| | Drawn yarn — Single yarn fineness (denier) | 1.63 | 1.56 | 1.52 | 1.48 | 1.62 | 1.57 | 1.55 | 1.56 |
| | Drawn yarn — Tensile strength (gf/denier) | 7.2 | 7.1 | 6.5 | 6.3 | 7.4 | 7.2 | 7.1 | 7.1 |
| | Drawn yarn — Tensile elongation (%) | 23 | 21 | 20 | 20 | 23 | 21 | 22 | 22 |

TABLE 2

| | | Comparative Example | | | | | |
|---|---|---|---|---|---|---|---|
| | | 1 | 2 | 3 | 4 | 5 | 6 |
| Production conditions | Setting temperature of heating mantle (° C.) | — | — | — | — | 100 | 280 |
| | Spinning speed (m/min) | 300 | 600 | 900 | 1100 | 300 | 300 |
| | Keeping time (seconds) | 0 | 0 | 0 | 0 | 0.0010 | 0 |
| | Spinning time (seconds) | 0.40 | 0.20 | 0.13 | 0.11 | 0.40 | 0.40 |
| | Mass per unit length of undrawn PGA resin single yarn (g/m) | $13.6 \times 10^{-4}$ | $6.8 \times 10^{-4}$ | $4.5 \times 10^{-4}$ | $3.7 \times 10^{-4}$ | $13.6 \times 10^{-4}$ | — |
| | Spinning property | A | A | A | A | A | C |

TABLE 2-continued

| | | | Comparative Example | | | | | |
|---|---|---|---|---|---|---|---|---|
| | | | 1 | 2 | 3 | 4 | 5 | 6 |
| Immediately after production | Undrawn yarn | Dry heat shrinkage ratio at 100° C. (%) | 40.9 | 57.3 | 59.8 | 65.0 | 55.9 | — |
| | | Tensile elongation (%) | 292 | 152 | 98 | 87 | 148 | — |
| | | Releasing property | A | A | B | B | B | — |
| | Drawn yarn | Single yarn fineness (denier) | 1.88 | 1.91 | 2.11 | 2.13 | 1.82 | — |
| | | Tensile strength (gf/denier) | 6.3 | 6.2 | 4.9 | 4.7 | 5.3 | — |
| | | Tensile elongation (%) | 16 | 17 | 16 | 17 | 19 | — |
| After storage at high temp. and high humid. | Undrawn yarn | Tensile elongation (%) | 198 | 110 | 72 | 70 | 102 | — |
| | | Releasing property | A | A | C | C | B | — |
| | Drawn yarn | Single yarn fineness (denier) | 2.23 | 2.10 | 2.13 | 2.13 | 2.11 | — |
| | | Tensile strength (gf/denier) | 4.7 | 4.4 | 4.3 | 4.4 | 4.9 | — |
| | | Tensile elongation (%) | 16 | 17 | 15 | 16 | 17 | — |

As is apparent from the results shown in Table 1, it was found that, when undrawn PGA resin yarns (Examples 1 to 8) were produced by the production method of the present invention, undrawn PGA resin yarns were obtained each of which had a small dry heat shrinkage ratio (55% or less) at 100° C., a high tensile elongation (150% or more) and an excellent releasing property immediately after production. It was also found that when the undrawn PGA resin yarns obtained in Examples 1 to 8 were drawn immediately after the production, drawn PGA resin yarns were obtained each of which had a small single yarn fineness (1.7 denier or less), a high tensile strength (7.0 gf/denier or more), and a high tensile elongation (20% or more).

Moreover, the undrawn PGA resin yarns obtained in Examples 1 to 8 were excellent in releasing property, even when exposed to the atmosphere having the high temperature and high humidity. It was found that even when the undrawn PGA resin yarns exposed to the atmosphere having the high temperature and high humidity were drawn, drawn PGA resin yarns were obtained each of which had a small single yarn fineness (1.7 denier or less), a high tensile strength (6.0 gf/denier or more), and a high tensile elongation (20% or more).

In addition, it was found that even when undrawn PGA resin yarns were produced under the same conditions of the temperature distribution in the heating mantle, the undrawn PGA resin yarns (Examples 1 and 2, and 5 and 6) having a mass per unit length of the undrawn PGA resin single yarn of $6.0 \times 10^{-4}$ g/m or more each had a smaller dry heat shrinkage ratio at 100° C. immediately after production and had a higher tensile elongation both immediately after the production and after the storage at high temperature and high humidity than the undrawn PGA resin yarns (Examples 3 and 4, and 7 and 8) having a mass per unit length of the undrawn PGA resin single yarn of less than $6.0 \times 10^{-4}$ g/m.

Moreover, it was found that drawn PGA resin yarns were obtained each of which had a higher tensile strength and a higher tensile elongation both immediately after the production and after the storage at high temperature and high humidity in the cases where the undrawn PGA resin yarns obtained in Examples 1 and 2, and 5 and 6 were drawn than those in the cases where the undrawn PGA resin yarns obtained in Examples 3 and 4, and 7 and 8 were drawn.

On the other hand, as is apparent from the results shown in Table 2, when the fibrous PGA resin was not kept in the atmosphere having the temperature according to the present invention (Comparative Examples 1 to 4), the obtained drawn PGA resin yarns had a low tensile elongation (19% or less). In particular, the undrawn PGA resin yarns (Comparative Examples 3 and 4) having a mass per unit length of the undrawn PGA resin single yarn of less than $6.0 \times 10^{-4}$ g/m were poor also in releasing property. In addition, the undrawn PGA resin yarn (Comparative Example 5) which was kept in the atmosphere having the temperature according to the present invention for a period of less than 0.0012 seconds was also poor in releasing property.

INDUSTRIAL APPLICABILITY

As described above, according to the present invention, it is possible to obtain an undrawn polyglycolic acid-based resin yarn excellent in releasing property and a drawn polyglycolic acid-based resin yarn having a small single yarn fineness, a high strength, and a high elongation.

Hence, the undrawn polyglycolic acid-based resin yarn of the present invention can be stored in a wound state, and moreover is excellent in releasing property even when exposed to the atmosphere having high temperature and high humidity. Therefore, the undrawn polyglycolic acid-based resin yarn is useful as a raw material for producing a drawn polyglycolic acid-based resin yarn having a small single yarn fineness, a high strength, and a high elongation in a large quantity.

REFERENCE SIGNS LIST

1: raw material hopper, 2: extruder, 3: gear pump, 4: spinneret (spinning nozzle), 5: heating mantle, 6: apparatus for applying oiling agent, 7: first take-up roller, 8: second take-up roller, 9: bobbin for undrawn yarn, 11: feeding roller, 12: first heating roller, 13: second heating roller, 14: third heating roller, 15: bobbin for drawn yarn

The invention claimed is:

1. A method for producing an undrawn polyglycolic acid resin yarn, comprising:
   a discharge step of discharging a molten polyglycolic acid homopolymer through a spinneret, to thereby form a fibrous polyglycolic acid homopolymer;
   a keeping step of keeping the fibrous polyglycolic acid homopolymer for 0.0012 seconds or more after the discharge in an atmosphere having a temperature of not lower than 110.5° C. but not higher than 220° C. which is a melting point of the polyglycolic acid homopolymer; and
   a cooling step of cooling the fibrous polyglycolic acid homopolymer obtained in the keeping step, to thereby obtain an undrawn polyglycolic acid resin yarn.

2. The method for producing an undrawn polyglycolic acid resin yarn according to claim 1, wherein
   the fibrous polyglycolic acid homopolymer is taken up in the keeping step and the cooling step such that a single yarn constituting the undrawn polyglycolic acid resin yarn has a mass per unit length of $6 \times 10^{-4}$ g/m or more.

3. A method for producing a drawn polyglycolic acid resin yarn, comprising:
- an undrawn yarn production step of obtaining an undrawn polyglycolic acid resin yarn by the production method of claim 1, wherein the undrawn polyglycolic acid resin yarn has a dry heat shrinkage ratio at 100° C. of 55% or less and a tensile elongation of 150% or more immediately after production; and
- a drawing step of drawing the undrawn polyglycolic acid resin yarn.

4. A method for producing a cut fiber, comprising:
- a drawn yarn production step of obtaining a drawn polyglycolic acid resin yarn by the production method of claim 3, wherein the drawn polyglycolic acid resin yarn has a single yarn fineness of 1.9 denier or less, a tensile strength of 6.0 gf/denier or more, and a tensile elongation of 20% or more; and
- a cutting step of cutting the drawn polyglycolic acid resin yarn.

\* \* \* \* \*